United States Patent
Yu et al.

(10) Patent No.: US 11,554,563 B2
(45) Date of Patent: Jan. 17, 2023

(54) REPLICATION AND RELATED METHODS AND DEVICES, IN PARTICULAR FOR MINIMIZING ASYMMETRIC FORM ERRORS

(71) Applicant: Heptagon Micro Optics Pte. Ltd., Singapore (SG)

(72) Inventors: QiChuan Yu, Singapore (SG); Han Nee Ng, Singapore (SG); Tobias Senn, Rüschlikon (CH); John A. Vidallon, Singapore (SG); Ramon Opeda, Singapore (SG); Attilio Ferrari, Rüschlikon (CH); Harmut Rudmann, Rüschlikon (CH); Martin Schubert, Rüschlikon (CH)

(73) Assignee: Heptagon Micro Optics Pte. Ltd., Singapore (SG)

( * ) Notice: Subject to any disclaimer, the term of this patent is extended or adjusted under 35 U.S.C. 154(b) by 121 days.

(21) Appl. No.: 16/640,530

(22) PCT Filed: Jul. 17, 2018

(86) PCT No.: PCT/SG2018/050353
§ 371 (c)(1),
(2) Date: Feb. 20, 2020

(87) PCT Pub. No.: WO2019/039999
PCT Pub. Date: Feb. 28, 2019

(65) Prior Publication Data
US 2020/0353707 A1    Nov. 12, 2020

Related U.S. Application Data

(60) Provisional application No. 62/548,486, filed on Aug. 22, 2017.

(51) Int. Cl.
*B29D 11/00* (2006.01)
*B29C 33/38* (2006.01)
*B29C 39/26* (2006.01)

(52) U.S. Cl.
CPC .... *B29D 11/00307* (2013.01); *B29C 33/3878* (2013.01); *B29C 39/26* (2013.01); *B29D 11/0048* (2013.01)

(58) Field of Classification Search
CPC .......... B29D 11/00307; B29D 11/0048; B29C 33/3878; B29C 39/26
See application file for complete search history.

(56) References Cited

U.S. PATENT DOCUMENTS

2010/0013113 A1    1/2010    Chang
2010/0096776 A1    4/2010    Xu et al.
(Continued)

FOREIGN PATENT DOCUMENTS

CN    101685188 A    3/2010
CN    102023323 A    4/2011
(Continued)

OTHER PUBLICATIONS

International Search Report for corresponding International Application No. PCT/SG2018/050353 dated Sep. 21, 2018.
(Continued)

*Primary Examiner* — Mathieu D Vargot
(74) *Attorney, Agent, or Firm* — Michael Best & Friedrich LLP

(57) ABSTRACT

The method regards manufacturing devices by replication, wherein each of the devices comprises a device surface. The method comprises producing the devices from a replication material by replication using a replication tool (1), wherein the replication tool (1) comprises a tool material comprising replication sites (4) comprising a replication surface (5)
(Continued)

each. Each of the replication surfaces (5) corresponds to a negative of the device surface of a respective one of the devices. The tool material comprises, in addition to the replication sites, one or more mitigating features (7) for reducing asymmetric form errors of the device surfaces. Replication tools (1) and methods for manufacturing these are also described.

18 Claims, 3 Drawing Sheets

(56) References Cited

U.S. PATENT DOCUMENTS

| 2011/0070733 A1 | 3/2011 | Kikuchi et al. |
| 2015/0077856 A1 | 3/2015 | Neo et al. |
| 2016/0091788 A1 | 3/2016 | Aritsuka et al. |
| 2017/0090074 A1 | 3/2017 | Bietsch et al. |

FOREIGN PATENT DOCUMENTS

| CN | 103978593 A | 8/2014 |
| EP | 1 443 344 A1 | 8/2004 |
| EP | 1 837 165 A1 | 9/2007 |
| EP | 1 837 166 A1 | 9/2007 |
| JP | 2013-161893 A | 8/2013 |
| KR | 20030035610 A | 5/2003 |
| WO | 0055893 A1 | 9/2000 |
| WO | 2012014987 A1 | 2/2012 |

OTHER PUBLICATIONS

Extended Search Report issued from the European Patent Office for related Application No. 18848830.8 dated May 10, 2021 (10 Pages).
International Preliminary Report on Patentability for Application No. PCT/SG2018/050353 dated Feb. 25, 2020 (7 pages).
Office Action issued from the Chinese Patent Office for related Application No. 201880067747.5 dated Aug. 31, 2021 (10 Pages including Statement of Relevance).
Notice of Grant issued from the Chinese Patent Office for related Application No. 201880067747.5 dated Jan. 21, 2022 (6 Pages including Statement of Relevance).
Office Action issued from the Taiwan Patent Office for related Application No. 111220358490 dated Apr. 15, 2022 (69 Pages including English Translation).

REPLICATION AND RELATED METHODS AND DEVICES, IN PARTICULAR FOR MINIMIZING ASYMMETRIC FORM ERRORS

CROSS REFERENCE TO RELATED APPLICATIONS

This patent application is the U.S. national stage entry, under 35 U.S.C. § 371, of International Application No. PCT/SG2018/050353, filed Jul. 17, 2018, which claims priority to U.S. Provisional Patent Application No. 62/548,486 filed Aug. 22, 2017, the entire contents of which are hereby incorporated by reference.

REFERENCE IS MADE TO

U.S. provisional application Ser. No. 62/503,464 (filed on May 9, 2017 by the same applicant)

TECHNICAL FIELD

The invention relates to the manufacture of devices, e.g., of optical devices, by means of replication, in particular on wafer level. More particularly, the invention relates to replication tools and to improvements of these, such as to be able to obtain replicated devices with a particularly high shape fidelity and thus with negligible or at least very small form errors only. It relates to methods according to the opening clauses of the claims. Such methods find application, e.g., in mass production of micro-optical devices.

DEFINITION OF TERMS

"Passive optical component": An optical component redirecting light by refraction and/or diffraction and/or (internal and/or external) reflection such as a lens, a prism, a mirror (plane or curved), optical filter, or an optical system, wherein an optical system is a collection of such optical components possibly also including mechanical elements such as aperture stops, image screens, holders.

"Replication": A technique by means of which a given structure or a negative thereof is reproduced. E.g., etching, embossing (imprinting), casting, molding.

"Wafer": A substantially disk- or plate-like shaped item, its extension in one direction (z-direction or vertical direction or stacking direction) is small with respect to its extension in the other two directions (x- and y-directions or lateral directions). Usually, on a (non-blank) wafer, a plurality of like structures or items are arranged or provided therein, typically on a rectangular grid. A wafer may have openings or holes, and a wafer may even be free of material in a predominant portion of its lateral area. A wafer may have any lateral shape, wherein round shapes and rectangular shapes are very common. Although in many contexts, a wafer is understood to be prevailingly made of a semiconductor material, in the present patent application, this is explicitly not a limitation. Accordingly, a wafer may prevailingly be made of, e.g., a semiconductor material, a polymer material, a composite material including metals and polymers or polymers and glass materials. In particular, hardenable materials such as thermally or UV-curable polymers are interesting wafer materials in conjunction with the presented invention.

"Light": Most generally electromagnetic radiation; more particularly electromagnetic radiation of the infrared, visible or ultraviolet portion of the electromagnetic spectrum.

BACKGROUND OF THE INVENTION

Ways of manufacturing optical devices on wafer level are known in the art. E.g., dozens, hundreds or thousands of lenses are produced in a single wafer-level replication process. A corresponding wafer-level replication tool can be used in a number of successive replication processes, so as to produce a number of times said dozens, hundreds or thousands of lenses using one and the same replication tool.

In mass production in general, and particularly in mass production of optical devices, reproducibility is of tremendous importance, as the properties of congeneric devices produced this way should be deviating as little as possible. Achieving a high reproducibility can result in high production yields and can simplify the overall manufacturing process by reducing efforts for reworking manufactured devices or of sorting out devices with properties deviating too much from set values.

It is thus highly desirable to achieve a high degree of process stability in replication, in particular in mass production.

Furthermore, the quality of the produced devices should be very high. Particularly the shape of the devices should deviate as little as possible from a desired shape. This is of major importance in case of optical devices, because for such devices, their respective optical properties (and thus also their—optical—quality) is intrinsically linked to their shape. Accordingly, surfaces of replicated devices should exhibit deviations from a desired device surface shape which are as small as possible.

SUMMARY OF THE INVENTION

Some types of form errors of replicated devices are of particular relevance, because they are hard to compensate. Randomly occurring form errors are hard to handle. If, however, the produced devices are reproducibly true to scale, i.e. the devices have the desired shape but are merely too small or too large, it can be possible to readily compensate for such errors by creating a replication tool which is true to scale by the factor suitable to result in devices which have the desired shape in the desired size. But, depending on the circumstances and on the reproducibility, even such a (seemingly) simple form error can be difficult to handle.

Other form errors, however, can be still more difficult to handle, namely, e.g., form errors which are asymmetric. By such "asymmetric form errors" we mean deviations of a shape of a replicated device which are not identical along all directions, i.e. the deviations (e.g., in terms of scaling factors) of the shape of the device from a desired shape are different along different directions, in other words, the shape deviations exhibit a notable (or even pronounced) directionality.

Such asymmetric form errors cannot be overcome by identically scaling the replication tool along all directions. Different scaling factors would have to be applied along different directions, which can be a cumbersome to implement. Therefore, avoiding such deformations of the produced devices can be difficult to accomplish.

If, for example, the devices to be produced by replication using the replication tool shall exhibit surfaces of rotational symmetry, but the devices obtained are not of rotational symmetry but elliptical or deformed in a still more complicated way, a correction of the errors by adjusting the replication tool can be difficult, in particular if the replication tool itself shall be produced in a replication process using a master. A master for the adjusted replication tool would have to exhibit a not rotational, but, e.g., an elliptical, symmetry, which can be more difficult than to produce a master having rotational symmetry.

And furthermore, it can in general be difficult to predict how the asymmetric form errors develop over several replication processes carried out using one and the same replication tool.

Investigations by the inventors did result in discovering the occurrence of asymmetric form errors in replication. The discovered directionalities of the shape deviations are tiny, and may have been observed never before. It was possible to detect them only because a high degree of process stability and reproducibility and a relatively high shape fidelity was achieved beforehand, and because a still higher form fidelity was targeted. Furthermore, the occurrence of the asymmetric form errors can be related to various circumstances of the replication process.

There seems to be no publication yet related to asymmetric form errors in replication, and more particularly, no publication related to ways of counteracting such asymmetric form errors.

A fully clear explanation for the occurrence of the asymmetric form errors may not yet be at hand. However, they seem to be related to shape changes of a tool material of the replication tool which occur during or after producing the replication tool and before or during the replication process in which the replication tool is used to manufacture the devices. The tool material is the material of the replication tool which establishes replication sites including replication surfaces which are negatives of device surfaces produced from a replication material in a replication process using the replication tool.

One or both of the following effects appear to be possibly responsible for at least a portion of the observed asymmetric form errors:

(i) stress, more particularly thermo-mechanical stress, present in the tool material;

(ii) dimensional changes occurring due to exposure of the tool material to another material such as to the replication material.

Effect (i) can occur, e.g., if the tool material is shaped using a master, and the temperature of the tool material is different at the time of said shaping and at the time of carrying out the replication process for producing the devices. For example, shaping the tool material is accomplished at an elevated temperature, such as between 50° C. and 100° C., and then the tool material is cooled down to room temperature, and producing the devices (in particular: shaping the devices in a replication material) is accomplished at room temperature.

Before reaching the elevated temperature, the tool material can be in an initial state (such as in an uncured state), in which it is dimensionally relatively unstable, e.g., liquid, and by the elevated temperature (and possibly also be an additional irradiation with light such as ultraviolet radiation), it is hardened (such as cured, i.e. cross-linked).

A CTE difference (difference in the coefficient of thermal expansion) between the tool material and a dimensionally stable (rigid) carrier can effect that stress is created in the tool material.

Effect (ii) can occur, e.g., during the replication process in which the devices are produced, and it can occur when the tool material is exposed to the replication material or to said other material at another time, e.g., prior to the replication process, such as in a conditioning process accomplished prior to the replication process. Details regarding such a conditioning process can be found in the U.S. provisional application Ser. No. 62/503,464 filed on May 9, 2017 by the same applicant.

The inventors determined that the exposure to the (not-yet hardened) replication material apparently can provoke dimensional changes of the tool material and thus of the shape of the replication surfaces. In a conditioning process, such as described in said U.S. provisional application Ser. No. 62/503,464, the replication material used later on, or a different material can be used.

Those dimensional changes of the tool material may be due to an open porous or spongy structure of the tool material. E.g., silicones such as polydimethylsiloxane (PDMS) can have such structures. It is assumed by the inventors that is possible that a portion of the material (replication material or said other material) permeates into the tool material and thus produces a dimensional change of the tool material.

A third effect was determined to possibly be of relevance for the occurrence of the asymmetric form errors:

(iii) an unusual distribution of the replication sites across the replication tool, such as an arrangement of the replication sites on points of a non-square grid.

If, as is customary, the multitude of replication sites is distributed over the tool material like points of a square grid, the asymmetric form errors apparently tend to be very small. However, if said distribution of the replication sites deviates therefrom, the asymmetric form errors tend to become notable (if respective analysis efforts are undertaken). For example, if the replication sites are distributed over the tool material like points of a rectangular grid with a side ratio of 3:1, the asymmetric form errors tend be more notable than if the side ratio is 1.2:1.

The third effect may possibly have its origin in a relatively low symmetry of the distribution of the tool material around each replication site in the vicinity of the replication site, such as a symmetry lower than a two-fold rotational symmetry (rotational symmetry of order two). The two-fold mirror symmetry as in the case of a rectangular-grid-type arrangement of replication sites is lower than (and results in a higher asymmetric form error than) the two-fold rotational symmetry as in the case of the customary square-grid arrangement of replication sites.

Furthermore, the inventors determined that, at least in certain circumstances, the asymmetric form errors and the directionality, respectively, are particularly pronounced in case of concave replication sites and more particularly in case of concave replication surfaces. The effects seem, however, to be smaller in case of convex replication sites and replication surfaces, respectively.

And still furthermore, the asymmetric form errors and the directionality, respectively, also, to some extent, seem to depend on structures of the replication tool which adjoin the replication sites and/or which surround the replication sites in its immediate vicinity. Irrespective of the exact circumstances of the replication and of the detailed reasons for the asymmetric form errors, the inventors have developed a way to overcome or at least mitigate the problem of the occurrence of asymmetric form errors.

According to the inventors, a significant improvement in replication processes can be achievable when one or more additional features are provided in the replication tool, more particularly in the tool material. Such one or more additional features can be, e.g., a structuring of the tool material (producing a different shape of the tool material) or a modification of the tool material (effecting different material properties of the tool material). In regard of their effect, the additional features will also be referred to as "mitigating features" (because they can be able to mitigate the undesired asymmetric form errors) or could be called "symmetrizing features" (because they can be able to symmetrize the design or distribution of the tool material, such as symmetrize the (lateral) mass distribution of the tool material and/or symmetrize the (lateral) distribution of locations across the tool material at which the tool material can relieve stress).

The mitigating features can be features which are located outside the replication sites.

The mitigating features can be features which are distinct from the replication sites.

The inventors determined that notably reduced asymmetric form errors of replicated devices can be achievable when providing suitable mitigating features. As will be understood, the exact design or physical form of the mitigating features can be selected differently for achieving minimized asymmetric form errors, depending on the asymmetric form error occurring without the provision of the mitigating features, i.e. for an identical replication tool which, however, is lacking the mitigating features.

The inventors determined that deformations of the replication sites (and more particularly of the replication surfaces) occurring in replication, e.g., in presence of one or more of the described effects, and eventually manifesting themselves in corresponding deformations of the replicated devices, can be reduced or even completely avoided by such mitigating features.

The usefulness of the mitigating features has turned out to be apparently particularly high in case of effect (iii), the unusual, low-symmetry distribution of replication sites (cf. above).

The inventors invented novel methods for manufacturing devices, novel replication tools, novel methods for manufacturing a replication tool, novel methods for improving quality in replication, such as methods for improving shape fidelity in replication, methods for improving accuracy in replication, or others (cf. below). All these aspects of the invention are, of course, interrelated, and details (such as features, effects, embodiments) described for one of them can apply to the others as well, as far as logically possible.

An example of an advantage of a version of the invention is to achieve a high accuracy in mass production of replicated devices, such as in replicated optical devices.

Another example of an advantage of a version of the invention is to provide a way of reducing undesired effects, in particular asymmetric form errors, originating in replication in case of specific arrangements of replication sites across a replication tool, in particular in case of low-symmetry arrangements.

Another example of an advantage of a version of the invention is to provide a way of reducing asymmetric form errors in replication.

Another example of an advantage of a version of the invention is to provide a way of reducing the number of rejects in replication.

Another example of an advantage of a version of the invention is to provide a way of increasing the number of acceptable devices produced using one and the same replication tool.

Another example of an advantage of a version of the invention is to provide a way of providing replication tools by means of which devices can be produced which have dimensions showing only very little deviations from desired dimensions, in particular showing only a very small directionality of shape deviations.

Further objects and various advantages emerge from the description and embodiments below.

At least one of these objects can be achieved in some implementations described in this disclosure.

The replication tool can be, e.g., a replication tool for manufacturing devices by means of replication, wherein the replication tool includes:
 a multitude of replication sites shaped in a tool material of the replication tool, wherein each of the replication sites has a replication surface having a shape corresponding to a negative of a surface of one of the devices; and, in addition,
 one or more mitigating features.

The mitigating features can include a structuring in the tool material.

The method for improving shape fidelity can be, e.g., a method for improving shape fidelity in replication using a replication tool including replication sites, wherein the method includes providing the replication tool with one one more mitigating features.

The method can also be considered a method for mitigating asymmetric form errors in replication, or a method for improving accuracy in replication, or a method for reducing a directionality of shape deviations of replication surfaces.

In some embodiments, the replication tool includes a tool material in which the replication sites are established, and the mitigating features establish one or more stress-relieving structures at which the tool material can relieve stress, in particular thermo-mechanical stress.

In some embodiments, the replication tool includes a tool material in which the replication sites are established, and the mitigating features contribute to making a mass distribution of the tool material in respective regions around each of the replication sites more uniform, more particularly more uniform than without the mitigating features.

In some embodiments, the mitigating features are distinct from, in particular distant from, the replication sites.

In some embodiments, the mitigating features are features which do not shape replication material from which devices are produced by replication using the replication tool. For example, no replication material is applied to the mitigating features during the replication process (in which devices are produced).

The method for manufacturing a replication tool can be, e.g., a method for manufacturing a replication tool, wherein the replication tool includes replication sites including a replication surface each, and wherein the method includes:
 producing the replication surfaces; and, in addition
 providing the replication tool with one or more mitigating features.

The method for manufacturing devices can be, e.g., a method for manufacturing devices by replication, wherein the method includes:
 providing a replication tool, wherein the replication tool includes replication sites including a replication surface each, and in addition, one or more mitigating features; and
 manufacturing the devices using replication using the replication tool.

In some embodiments, each of the devices includes a device surface, and each of the replication surfaces corresponds to a negative of the device surface of one of the devices.

The mitigating features can have effects as described in the instant patent application.

In an exemplary replication process, such as in an embossing process, a replication material in a deformable state, e.g., in a liquid state, present between the replication tool and a substrate, can be shaped by the replication tool, more specifically by the replication sites established by the tool material, and then hardened, such as by exposure to energy such as heat and/or irradiation with light. Then, the replication tool is removed, and the so-obtained devices remain on the substrate.

Therein, the replication material can be locally applied. Instead of applying a continuous layer of (deformable) replication material across the tool material, a separate portion of replication material is applied for each one of the devices. The replication material can be applied to the tool material, e.g., to each replication site or more particularly to each replication surface. Or it can be applied in separate portions, one for each device, to the substrate; of course such that when replication tool and substrate are brought together, each portion gets into contact with a different one of the replication sites. And it is also possible to apply the replication material, in the described way, to both, the replication tool and the substrate.

In the replication process, a multitude of separate devices can be produced on the substrate.

Not only the devices, but also the replication tool itself can be manufactured using replication. E.g., the devices can be produced using embossing with flow control (cf. further below for details), and the replication tool can be produced using injection molding or embossing, e.g., the tool material can be shaped using injection molding or embossing (such as stamping, e.g., without flow control).

The tool material can be the material of the replication tool which is brought into contact with the replication material in a replication process.

The tool material can be, e.g., a resilient material such as, e.g., a silicone. This way, the replication tool can, e.g., compensate, by means of the resilience of tool material, lacking planarity of a substrate on which the devices are produced in the replication process.

The replication tool includes replication sites in which the replication material is shaped, and the tool material can be the material forming a replication surface in each of the replication sites. Each of the replication surfaces is shaped to correspond to the negative of the shape of a surface of a device to be produced.

The replication sites can exhibit an additional surface portion each (in addition to the replication surface), which can, e.g., laterally encompass the replication surface, and which can, in the replication process, shape a portion of the replication material, too.

However, such a portion of the replication material can form a unitary part with the produced device while not being part of the device itself. E.g., such a portion of the replication material can establish a surrounding portion encompassing the device. This can be of particular relevance if the replication process is an embossing process, more particularly is embossing with flow control.

In addition to the tool material, the replication tool can include a dimensionally stable (rigid) carrier, e.g., a plate, such as, e.g., a glass plate or a metal plate, to which the tool material is attached. This can facilitate handling the replication tool and ensure an overall dimensional stability of the replication tool, and also of the tool material. However, as described above, differences in the CTE (coefficient of thermal expansion) between the carrier and the tool material can contribute to asymmetric form errors which may be reduced in the described ways. E.g., the (linear) CTE of the tool material can be at least 2 times, in particular at least 5 times, more particularly at least 10 times, as high as the CTE of the carrier, e.g., at room temperature.

A main purpose of the mitigating features can be to effect that the devices produced have a shape which is more similar to a desired shape than if the mitigating features would not be present in the replication tool (and the replication tools being otherwise identical). More particularly, a directionality of shape deviations of the replication surfaces can be reduced by the provision of the mitigating features. In other words, if scaling factors by which dimensions of the produced devices can be mapped onto desired device dimension are notably different along different directions, the provision of the mitigating features can effect that these scaling factors differ less from each other (thus exhibiting a smaller directionality), or are—ideally—even identical for all directions (and thus exhibit no directionality), for devices produced with a replication tool including the mitigating features. Alternatively to referring to desired device surface shape as a reference for the shape deviations, it is also possible to refer the shape of a master by means of which the replication tool is manufactured—at least in case the replication tool itself is manufactured by replication using a master. The shape of the shaping surfaces of the master is, in many instances, identical to the desired shape of the devices to be produced, possibly except for a single scaling factor, i.e. a scaling factor which is identical for all directions or at least for all directions or dimensions considered.

From a slightly different point of view, the mitigating features can be considered to (at least partially) compensate an asymmetry (or directionality) of dimensional changes of the replication surfaces, in particular wherein the dimensional changes occur (without the provision of the mitigating features) after shaping the replication surfaces and before producing the devices.

The directionality of the shape deviations and the asymmetric form errors, respectively, can be considered in three dimensions. E.g., one can, for a simple but useful approach and approximation, concentrate on three scaling factors, such as one along an x-axis, one along a y-axis, and one a z-axis. However, in some embodiments, they can be limited to two dimensions. A simple but useful approach and approximation in this case can be to work with two scaling factors, one along an x-axis, the other along a y-axis. In particular when the replication tool is a wafer, the two directions can be lateral directions, more particularly two mutually perpendicular directions parallel to the wafer plane (and thus both perpendicular to the vertical direction in which the replication tool wafer is thin).

For example, it can be a directionality and/or a form error along lateral directions that is mitigated by the mitigating features.

In some embodiments, the devices include passive optical components.

In some embodiments, each of the devices includes at least one optical lens.

In embodiments in which the devices to be produced are, e.g., rotationally symmetric (optical) lenses (such as lenses exhibiting a rotational symmetry about the vertical axis), an asymmetric form error in the lateral plane (x-y-plane) results in focussing problems: the lenses are slightly elliptical and thus exhibit an optical aberration such as an astigmatism, which in many instances is undesired. The provision of the mitigating features can reduce (or even remove or avoid) the directionality of the shape deviations and thus enable the production of rotationally symmetric lenses with no or only a small (undesired) optical aberrations such as with no or only a small (undesired) astigmatism.

In some embodiments, the devices include an optical lens of rotational symmetry each, in particular an optical microlens.

In some embodiments, the devices include an aspherical optical lens of rotational symmetry each. Aspherical replication surfaces and, e.g., masters for aspherical lenses, are not trivial to produce; however, their manufacturability can be much better if they are of rotational symmetry. Therefore, the mitigating features can be particularly useful in case of aspherical devices (e.g., aspherical optical lenses) of rotational symmetry.

And, the mitigating features can be particularly useful in case that the replication surfaces are (prevailingly) concave. If the replication surfaces are recesses in the tool material, a swelling (i.e. a dimensional increase) of the tool material, e.g., in response to an exposure to some material such as to the replication material, tends to decrease the size of the replication surface and in particular tends to decrease a (lateral) footprint of the replication surface. This effect apparently tends to be sensitive to the structuring of the tool material in the vicinity of the replication surfaces. Unusual arrangements of the replication sites (e.g., deviating from a square-grid arrangement) apparently can lead to the undesired asymmetrical form errors.

Similarly, the mitigating features can be particularly useful in case the devices include (prevailingly) convex devices, such as in case convex optical lenses are replicated using the replication tool.

The inventors determined that exposuring the tool material (in its hardened state) to the (not-yet hardened) replication material (e.g., during the replication process or during a foregoing conditioning process) apparently can provoke dimensional changes of the tool material and thus of the shape of the replication surfaces. This effect depends on properties of the tool material.

In some embodiments, the tool material has an open porous structure.

In some embodiments, the tool material has a spongy structure.

In such cases, a portion of the replication material or of another material to which the tool material is exposed (such as a conditioning material used in a conditioning process) can permeate into the tool material, thus dimensionally changing the tool material.

In some embodiments, the tool material is interspersed with pores and/or channels (e.g., in a spongy and/or open porous material), and a portion of a fluid present in at least a portion of the pores and channels, respectively, prior to an exposure to the replication material (or to said other material, cf. above) is replaced by said material. E.g., the tool material can be filled with a fluid prior to said exposure, more specifically, the pores and channels, respectively, can be filled with a fluid. The fluid can be, e.g., a liquid. E.g., in case of a silicone as the tool material, the pores and channels, respectively, can initially be filled with uncured (i.e. not cross-linked) silicone, e.g., with PDMS precursors.

In some embodiments, the fluid effects that a separation of the hardened replication material from the tool material is facilitated. E.g., the fluid can form a film on the tool material which reduces an adhesion between the replication material and the tool material.

In some embodiments, the replication material is a curable material, e.g., a curable polymer material.

In some embodiments, the replication material is an epoxy resin.

In some embodiments, the tool material is a polydimethylsiloxane (PDMS).

A deformability of the tool material can level insufficient planarity of the substrate on which the devices are replicated.

In some embodiments, the replication sites are arranged in a pattern different from a square grid. Such patterns can in instances lead to asymmetric form errors requiring compensation through the mitigating features.

In some embodiments, the replication sites are arranged on a non-square rectangular grid. E.g., locations of the replication sites can define a non-square rectangular grid. Asymmetric form errors possibly emerging, may be mitigated by the provision of the mitigating features.

In some embodiments, a pattern defined by the mitigating features overlaps the grid. In particular, the mitigating features can interlace the grid. When the mitigating features are interspersed with the replication sites, the effect of the mitigating features can be particularly good, because the replication sites (and the replication surfaces, respectively) can be influenced rather locally by the mitigating features.

In some embodiments, the mitigating features are located distant from any of the replication sites.

In some embodiments, the mitigating features are located outside any of the replication sites.

In some embodiments, the mitigating features are arranged in the vicinity of each of the replication sites.

In some embodiments, at least a portion of the mitigating features, e.g., all of them, is arranged between neighboring ones of the replication sites.

This way, the reduction of asymmetric form errors can take place in a rather local fashion, which can be particularly effective. Particularly local ways of counteracting asymmetric form errors are described further below.

In some embodiments, the mitigating features establish an arrangement of separate features. For example, the separate features can be arranged to define a grid. Or the separate features can be arranged to define a row of features, e.g., of equally distant features. In some embodiments, along at least one lateral direction, a periodicity of the arrangement is an integer multiple of a periodicity of a grid defined (along said lateral direction) by the replication sites. In a simple example with a rectangular grid of replication sites (cf. also above), one (long) cut or groove may be located between neighboring rows of replication sites along the y-axis; or, in the same example, not a (long) cut or groove, but a row of, e.g., equally-distanced (short) cuts or recesses is provided—wherein a periodicity of the equally-distanced (short) cuts or recesses along the y-axis can optionally be, e.g., an integer multiple of a periodicity of the grid defined by the replication sites along the y-axis.

In some embodiments, the replication sites are arranged in several mutually parallel rows. In particular, the rows can run along lines along which a distance between neighboring ones of the replication sites is minimal.

In some embodiments, the mitigating features are arranged between neighboring ones of the rows. In instances, one or more of the mitigating features can, more particularly, be arranged between each pair of neighboring ones of the rows.

In some embodiments, the mitigating features describe a multitude of mutually parallel rows. In instances, these rows are aligned parallel to the rows in which the replication sites are arranged.

In some embodiments, the mitigating features include a multitude of mutually parallel cuts.

Cuts in the tool material can, in instances, provide the desired mitigating effect. The cuts can be incisions.

Cuts in the tool material can, in general, explicitly include the case that the tool material on both sides of the cut is in touch with one another. Tool material left to the cut can be in direct mechanical contact with tool material right to the cut. Such cuts can be simple to produce, e.g., by laser cutting or by means of a dicing saw.

In some embodiments, the mitigating features include a multitude of mutually parallel recesses, e.g., grooves.

Recesses in the tool material can, in instances, provide the desired mitigating effect.

In some embodiments, the mitigating features include portions of the tool material which have modified material properties, such as modified mechanical properties. For example, the tool material can have material properties in said portions which differ from the material properties of the tool material at the replication sites.

In some embodiments, the mitigating features are located at one and the same side of the tool material as are the replication sites. E.g., they may be present at a face of the tool material facing away from the carrier.

In some embodiments, replication material from which the devices are made is shaped solely by the replication sites.

In some embodiments, the mitigating features are distinct from the replication sites.

In some embodiments, the mitigating features are distinct from the replication surfaces.

In some embodiments, replication material from which the devices are made is not shaped by the mitigating features; and more particularly, it is not even brought in contact with the mitigating features.

In some embodiments, the mitigating features include or, more particularly constitute, a structuring of the tool material. The structuring can include a shape variation of the tool material. E.g., cuts or recesses can be produced in the tool material.

In some embodiments, the mitigating features include one or more cuts in the tool material. The cuts can extend, e.g., through at least 30% of a thickness of the tool material, or more particularly through at least 50% or through at least 65% of the thickness of the tool material. Deeper cuts possibly can effect a more efficient reduction of asymmetric form errors, possibly due to allowing more relaxation of stress in the tool material. The cuts can extend, in instances, fully through the tool material, however, depending on the material of an underlying carrier, this may bear a risk. Therefore, in instances, the cuts extend through less than the full thickness of the tool material.

In some embodiments, the mitigating features include one or more recesses in the tool material; for example, the mitigating features can include one or more grooves in the tool material; and/or the the mitigating features can include a multitude of separate recesses such as that the tool material is interspersed with such separate recesses. Recesses can, in instances, be useful, e.g., when the device surfaces are convex and/or when the replication surfaces are concave.

The recesses can have, e.g., depths of at least 10% of a depth of neighboring replication surfaces. They can have, e.g., depths of at most 10 times a depth of neighboring replication surfaces. For example, the recesses can have depths of at least 0.2 times and of at most 5 times a depth of neighboring replication surfaces.

In some embodiments, the recesses extend through at least 10% of a thickness of the tool material, or more particularly through at least 30% or through at least 50% of the thickness of the tool material.

Deeper recesses possibly can effect a more efficient reduction of asymmetric form errors, possibly due to allowing more relaxation of stress in the tool material. However, if circumstances are such that a directionality of a mass distribution of the tool material (e.g., due to a low-symmetry arrangement of the replication sites) notably contributes to the formation of asymmetric form errors (e.g., due to effect (ii) described above), relating a depth of the recesses to a depth of the replication sites can be meaningful.

The recesses can extend, in instances, fully through the tool material, however, depending on the material of an underlying carrier, this may bear a risk. Therefore, in instances, the recesses extend through less than the full thickness of the tool material.

In some embodiments, the mitigating features include one or more protrusions protruding from the tool material. Protrusions, e.g., made from the tool material, can, in instances, be useful, e.g., when the device surfaces are concave and/or when the replication surfaces are convex.

In some embodiments, at least a portion of the mitigating features run along lines which are aligned parallel to lines along which a distance between neighboring ones of the replication sites is minimal. For example, if the replication sites are arranged to define a rectangular (non-square) grid with lattice constants dx, dy, wherein dx>dy, at least a portion of the mitigating features run along the y-axis. For example, the mitigating features can include a cut or groove running along the y-axis between, e.g., centrally between, rows (running parallel to the y-axis) of neighboring replication sites. The cuts and grooves, respectively, can extend at least to the boarders defined by the grid.

In some embodiments, the mitigating features are produced in a replication process, in particular in one and the same replication process as are the replication sites.

For example, the not-yet-hardened tool material is shaped using a master wafer, and the master wafer includes, in addition to shaping sites for shaping the replication sites in the tool material, additional shaping sites for shaping the mitigating features in the tool material.

In a first way of accomplishing this, the shaping sites and the additional shaping sites are included in one and the same piece of a master material of the master wafer (analogous to the tool material of the replication tool). An integrally formed piece of the master material can provide both, the shaping sites and the additional shaping sites. The master material can be shaped, e.g., using a replication technique in order to produce the shaping sites and the additional shaping sites in the master material.

In a second way of providing a master wafer for producing the shaping sites and the additional shaping sites of the replication tool by replication, the master wafer includes one or more placeholders. The placeholders can be attached to, e.g., bonded to, a master material of the master wafer, e.g., in an integrally formed piece of the master material; wherein the shaping sites (for shaping the replication sites in the tool material) are included in the master material, and the placeholders provide the additional shaping sites (for shaping the mitigating features in the tool material). For example, initially, the master material is shaped to include all the shaping sites, e.g., by replication or by machining. And then, the placeholders are bonded to the master material, e.g., using an adhesive. The placeholders can be, e.g., pieces of a material which can be a dimensionally stable material, such as of glass or of metal or of a dimensionally stable polymer. For example, glass bars can be used as the placeholders. When using such a master wafer to produce a replication tool by replication, device surfaces are shaped by the shaping sites in the master material, and the mitigating features are shaped by the placeholders. A shape of the mitigating features therefore can correspond to a negative of a shape of the placeholders. For example, the mitigating features can be recesses, such as grooves, e.g., in case the placeholders are bar-shaped.

Said second way can facilitate determining a suitable shape and a suitable position of mitigating features for particularly effectively minimizing asymmetric form errors.

Namely, for example, several different placeholders which distinguish, e.g., by material and/or by shape, can be used with master material of identical shape, such as with one and the same piece of master material, or with different pieces of master material which however are identically shaped (at least with respect to the shaping sites). And it is also relatively simply possible to vary, e.g., for master material of identical shape, the locations where the placeholders are attached to the master material, e.g., relative to the locations of the shaping sites.

The master material can itself be a replication material such as a curable polymer, e.g., an epoxy resin or a silicone such as PDMS. But the master material can also be a metal or glass.

In some embodiments, the mitigating features are produced by machining the shaped tool material, in particular the hardened tool material. For example, after shaping the tool material to form the replication sites, cuts are cut into the tool material, e.g., using a dicing saw, and/or grooves or other recesses are produced in the tool material, such as by removing a portion of the tool material from the replication tool, e.g., by means of milling or laser ablation.

In some embodiments, the mitigating features include or, more particularly constitute, portions of the tool material which have modified material properties. For example, locally (namely in locations where said portions shall be located), a processing is applied to the tool material to locally modify said properties, e.g., to increase a bonding strength within the tool material or to otherwise (further) harden the tool material.

For example, the tool material can be locally processed, e.g., after it has been shaped and hardened. In instances, the hardening generally applied to the tool material in full (cf. below) does not result in a full hardening (e.g., no full curing) of the tool material, such that a still further hardening can take place still afterwards to produce the mitigating structures. A further hardening of the tool material can be accomplished locally, e.g., by local tempering, such as by heating using laser radiation.

In some embodiments, the tool material is locally irradiated, e.g., by laser radiation, to modify, e.g., to harden, the tool material in the desired portions, so as to produce the mitigating structures having modified material properties.

In some embodiments, the tool material is processed, e.g., irradiated, such as by means of a laser, according to a pattern, for example along lines of a grid, or at grid points of a grid, or in the vicinity of each replication surface.

In some embodiments, the replication material is a material which can be in an initial state, such as in a liquid, in a viscous or in a plastically deformable state, and which can be transformed into a hardened state by exposure to energy, and wherein the replication material is in its initial state at the time of initially exposing the tool material to the replication material, and the replication material is hardened while being shaped by the tool material when located between the replication tool and the substrate.

In some embodiments, the replication material is a curable material (and its initial state is its uncured state). Curing (and, thus, hardening) the replication material can be accomplished, e.g., by irradiation, e.g., with UV light, and/or by heating the replication material.

In some embodiments, the replication tool is a wafer.

In some embodiments, the replication tool is a stamping tool, e.g., as for use in an embossing process.

In some embodiments, the devices are replicated in an embossing process known as embossing with flow control. In embossing with flow control, the device (also referred to as "main portion") and a surrounding portion at least partially surrounding the main portion are manufactured in one and the same replication process: Device (main portion) and surrounding portion are made of the same replication material, and they form a unitary part. In such a replication process, the replication tool together with the substrate does not fully enclose the replication material, but they form a volume open to the outside allowing replication material (in its initial state) to spread out of a volume portion in which said main portion (device) will be formed and into an outside volume portion where said surrounding portion will be formed. The flowing of the replication material is predominantly driven by capillary forces. In order to control the flow of replication material, the replication sites include, in addition to the replication surface, an additional surface portion. This additional surface portion can, e.g., laterally surround the replication surface, and can determine, in part, the shape of the surrounding portion.

As has been described above, the mitigating features can be features which are distinct from the replication sites. However, in some embodiments, the mitigating features are integrated in the replication sites; e.g., they can be integrated in the additional surface portions while being distinct from the replication surfaces. This way, an occurrence of asymmetric form errors can be counteracted in a very local fashion. E.g., a design of the additional surface portions can provide for the function of mitigating asymmetric form errors and also for the function of controlling the flow of replication material during the replication process.

In some embodiments, the mitigating features are distinct from but adjoining the replication sites. This way, an occurrence of asymmetric form errors can be counteracted in a very local fashion.

In some embodiments, two or more replication processes are successively carried out using the replication tool, and in each of these replication processes, a plurality of devices is produced which can be congeneric devices.

The method for manufacturing a replication tool can be, e.g., a method for manufacturing a replication tool, wherein the replication tool includes replication sites including a replication surface each, and wherein the method includes:

producing the replication surfaces using replication using a master having one or more shaping surfaces, each of the replication surfaces corresponding to a negative of a respective one of the one or more shaping surfaces;

providing the replication tool with one or more mitigating features for reducing a directionality of a shape deviation of the replication surfaces from the respective one or more shaping surfaces.

In a slightly different view, the method for manufacturing a replication tool can be, e.g., a method for manufacturing a replication tool for manufacturing devices using replication, the replication tool including replication sites including a replication surface each, each of the replication surfaces corresponding to a negative of a device surface of a respective one of the devices. And for each of the device surfaces, a respective desired device surface shape is defined. And the method includes producing the replication surfaces;

providing the replication tool with one or more mitigating features for reducing a directionality of a shape deviation of the replication surfaces from a negative of a respective one of the desired shapes.

The replication surfaces can be produced in a tool material of the replication tool.

The mitigating features can be produced in a tool material of the replication tool.

Further embodiments and advantages emerge from the following description and the enclosed figures and from the dependent claims.

BRIEF DESCRIPTION OF THE DRAWINGS

Below, the invention is described in more detail by means of examples and the included drawings. In the drawings, same reference numerals refer to same or analogous elements. The figures show schematically.

The described embodiments are meant as examples or for clarifying the invention and shall not limit the invention.

DETAILED DESCRIPTION OF THE INVENTION

Figure 1:
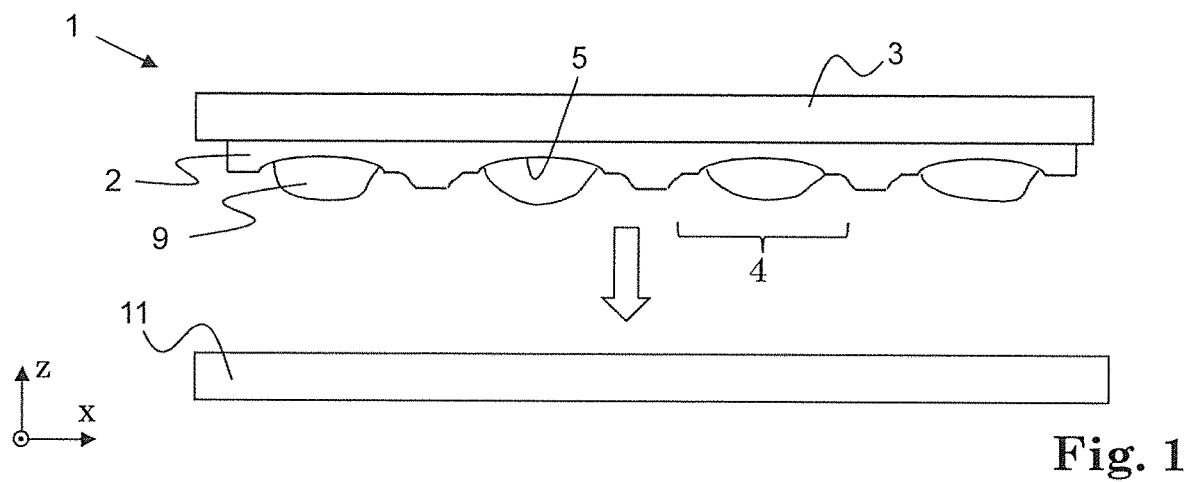
FIG. 1 a schematic illustration of a replication tool with locally applied replication material, in a cross-sectional view.

FIG. 1 schematically illustrates a replication tool 1 in a cross-sectional view which is a wafer-level replication tool for embossing. It includes a tool material 2 which adheres to a rigid carrier 3 such as a glass plate. The tool material 2 establishes a number of replication sites 4, four of which are illustrated in FIG. 1. In each replication site, a replication surface 5 is provided which exhibits the negative of the shape of a surface of a device to be produced by replication using the replication tool 1.

Replication tool 1 includes mutually distanced replication sites 4, for the manufacture of separate devices by replication, such as a multitude of microlenses.

The tool material 2 can be a resilient material, and it can be a material which is interspersed pores and/or channels.

The tool material can be a spongy material.

The tool material can be, e.g., a polydimethylsiloxane (PDMS).

Figure 2:
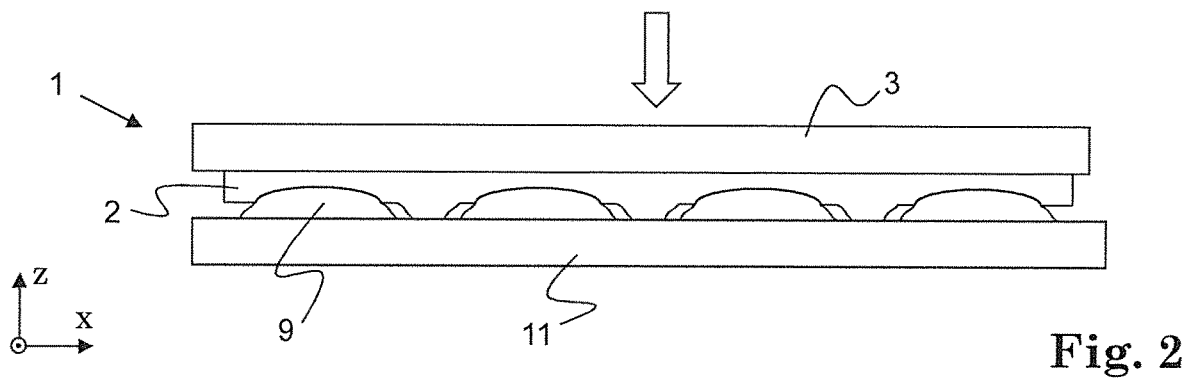
FIG. 2 a schematic illustration of shaping of replication material during an embossing process using the replication tool of FIG. 1, in a cross-sectional view.
Figure 3:
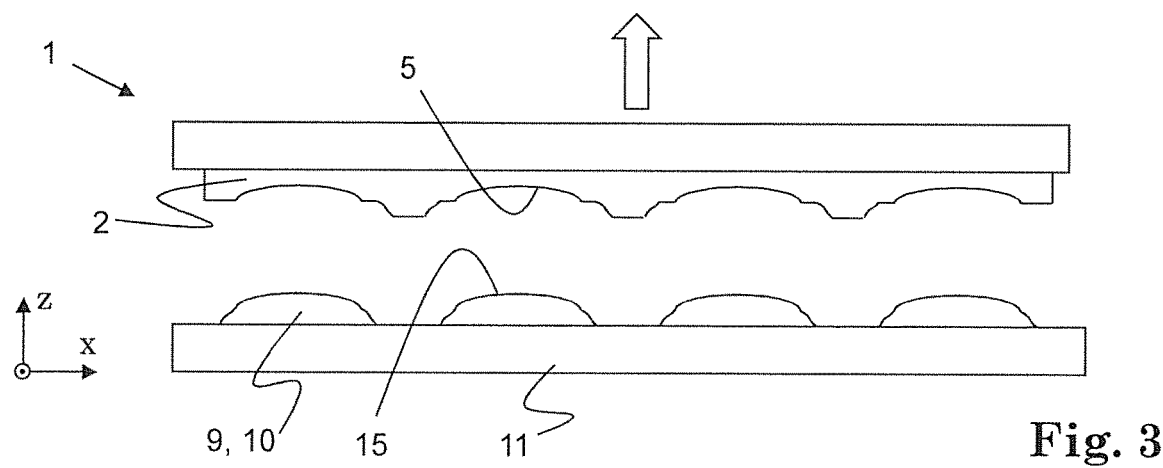
FIG. 3 a schematic illustration of a removal of the replication tool of FIGS. 1 and 2 from produced devices, in a cross-sectional view.

In FIGS. 1 to 3, a replication process is illustrated. The replication process in the illustrated embodiment is an embossing process. A replication material 9 is applied between tool material 2 and a substrate 11 which can be a rigid plate such as a glass plate. Replication material 9 can be applied locally, in a plurality of separate portions. In FIG. 3, this is the case, and replication material 9 is applied to tool material 2, but, e.g., application to substrate 11 (in addition or alternatively) would be possible, too.

The replication material 9 can be, e.g., a curable material, e.g., a curable epoxy resin.

With replication material 9 between substrate 11 and replication tool 1, these two are moved towards each other, e.g., until they abut each other, cf. FIG. 2. In this position, replication material 9 is shaped at the replication sites 4 of replication tool 1, and more particularly, each portion of the applied replication material 9 is shaped by one of the replication surfaces 5. At the same time, replication material 9 is in contact with substrate 11, too.

While maintaining the relative position of substrate 11 and replication tool 1, replication material 9 is hardened, e.g., cured, e.g., by UV irradiation and/or by application of heat.

After the hardening process, a plurality of separate devices 10 is produced on substrate 11 each of which has a device surface 15 having a shape corresponding to the negative of the shape of one of the replication surfaces 5, and replication tool 1 is removed, cf. FIG. 3.

As an option, it is possible to subject the replication tool 1, in particular the tool material 2, to a conditioning step before carrying out the replication process, e.g., by exposing the tool material 2 to a conditioning material. Such a conditioning material can be, e.g., the same material as the replication material used in the replication processes, e.g., they both can be the same epoxy resin. The conditioning material can be applied locally (such as illustrated in FIG. 1 for the replication material) or, e.g., by applying a continuous film of conditioning material which covers all replication sites 4.

In reaction to the exposure to the conditioning material, tool material 2 can slightly change dimensionally, e.g., it undergoes a slight swelling process. For example, a portion of conditioning material can afterwards be present in pores and channels of an open porous structure of tool material 2, wherein it can have replaced a portion of material, e.g., of PDMS precursors and uncured PDMS, respectively, present in the pores and channels prior to the exposure to conditioning material.

Subsequently, the conditioning material is removed from tool material 2. A possible way of removing the conditioning material from replication tool 1 is to harden the initially liquid conditioning material, e.g., by exposing it to energy, such as by irradiating it with UV radiation and/or by heating it, and then to remove the hardened conditioning material.

The conditioning can effect that a size of produced devices 10 can be more precisely predicted and that the size of produced devices 10 can be kept very constant during several replication processes which are successively carried out using one and the same replication tool 1. Further details regarding the conditioning are described in the U.S. provisional application Ser. No. 62/503,464 mentioned above.

However, an effect observed by the inventors relates not so much to the (overall) size of the produced devices 10, but rather to their shape, and more particularly to asymmetric form errors the devices 10 can exhibit.

Figure 4:
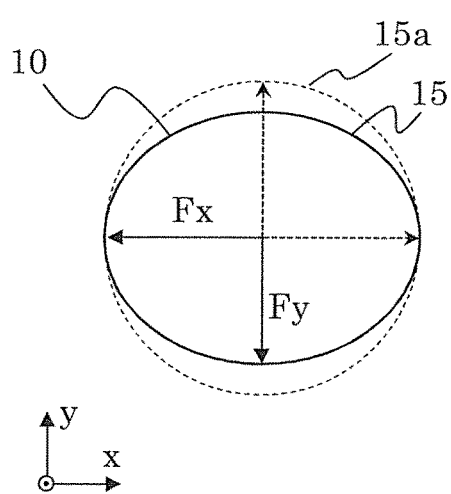
FIG. 4 a schematic illustration for explaining an asymmetric form error.

FIG. 4 is a schematic illustration for explaining an asymmetric form error, as it may occur in a replication process such as in the embossing process illustrated in FIGS. 1 to 3. The elliptical shape illustrates a produced device 10 in a top view, i.e. in a vertical view onto the lateral plane (x-y-plane).

The dotted circle illustrates a desired shape 15a of the device. Obviously, there is a discrepancy between the desired (rotationally symmetric) shape 15a and the actual shape 15 which merely as an elliptical symmetry, i.e. there are shape deviations between the desired shape 15a and the actually produced shape which have a directionality. (If the discrepancies were identical along all directions, there would be no directionality of the the shape deviations, and a simple overall scaling could convert the produced shape 15 into the desired shape 15a.)

In the illustrated simple case, the size of device 10 along the x-axis corresponds to the desired size, but the size along the y-axis is smaller than desired.

Of course, shape deviations can be much more complicated, exhibiting a more complicated directional dependencies. And generally, also the third dimension (along the z-axis) could be considered. However, how to handle these more complicated approaches and cases will become clear from the explanations regarding the instant relatively simple case.

Concentrating on merely a dimension along the x-axis and a dimension along the y-axis, one can simply quantify the shape deviations by two scaling factors, Fx and Fy, for the respective two directions. E.g., Fx=(device size along x)/(desired size along x) and Fy=(device size along y)/(desired size along y). In the illustrated case, Fx equals 1, and Fy is lower than one, e.g., is approximately 0.8.

A numerical value for the directionality can be defined, e.g., by forming the quotient of the (absolute values of the) scaling factors (Fx, Fy) for the considered directions and subtracting 1 therefrom, i.e. in the instant case a value for the directionality would be 1.0/0.8−1=1.25−1=0.25. Other ways of defining a numerical value for the directionality are readily at hand, such as involving integration over directions and/or other ways of normalizing.

Reducing this value, optimally to zero, is a goal to be achieved for improved shape fidelity in replication. This can be achieved by the provision of mitigating features, e.g., in the way as herein described.

Whereas FIG. 4 has been explained above in terms of illustrating the produced device 10, it is also possible to regard FIG. 4 as illustrating a replication surface 5 of a replication tool 1 (in a vertical view)—at the time of shaping the replication material (such as in FIG. 2). And the dashed circle would illustrate a desired device shape The explanations are analogous.

Figure 5:
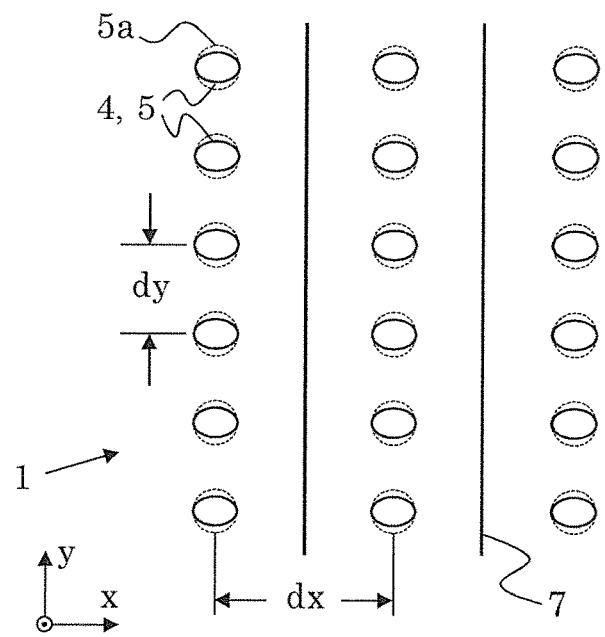
FIG. 5 a schematic illustration of a replication tool having mitigating features, in a top view onto the tool material.

FIG. 5 illustrates in a top view a replication tool 1 having mitigating features 7. The replication sites 4 and replication surfaces 4 are arranged on points of a non-square rectangular grid. The next-neighbor distances in x- and y-direction are dx and dy, respectively, with dx>dy. Similarly as in FIG. 4, the dotted circles labelled 5a indicate the desired shape of the replication surfaces 5—in this view in the lateral plane; and the ellipses symbolize the actual shapes labelled 5 in absence of mitigating features 7 exhibiting an asymmetric form error (a directionality of shape deviations). The replication surfaces 5 can be, e.g., concave surfaces, resulting in convex produced device surfaces. The mitigating features 7 are in this embodiment cuts in the tool material. The mitigating features 7 can run, as illustrated in the instant embodiment, along mutually parallel lines, e.g., parallel to the direction along which the next neighbor distance is lower (i.e. along the y-direction), and the mitigating features 7 can be located in the middle between neighboring rows of replication sites 5.

With the mitigating features 7 provided in the replication tool 1 and more particularly in the tool material 2, the asymmetry of the form errors (and the directionality of the shape deviations) is much reduced, such that the replication surfaces 5 assume at least approximately the shape illustrated by the dashed circles labelled 5a.

The cuts can be applied to the tool material after producing the replication sites 5, such as after hardening the tool material 2 (provided that the tool material is shaped in a replication process).

Assumed reasons why the provision of the mitigating features 7 makes possible to overcome asymmetric form errors (at least in part) have been explained above.

Mitigating features 7 can also be different from cuts. E.g., they can be recesses in the tool material.

Figure 6A:
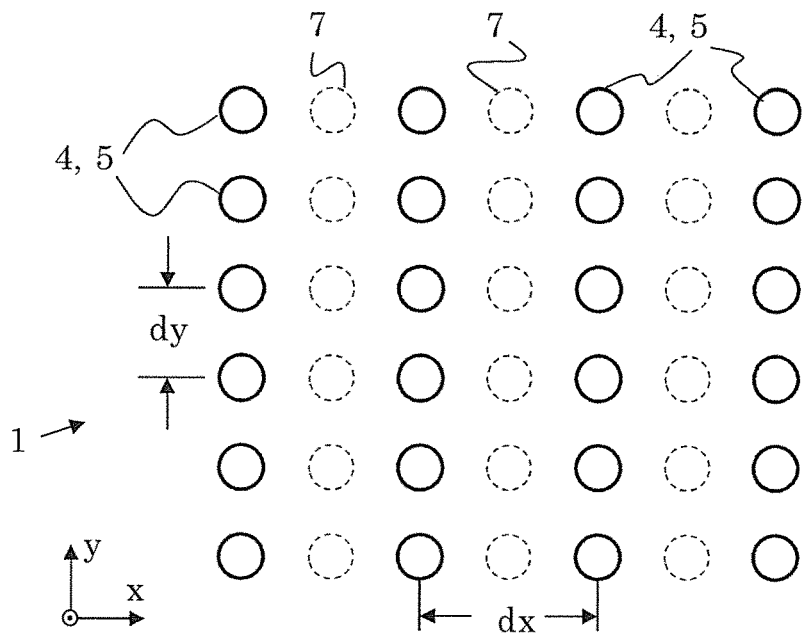
FIGS. 6a, 6b a schematic illustration of a replication tool having mitigating features, in a vertical view and in a cross-sectional view, respectively.
Figure 6B:
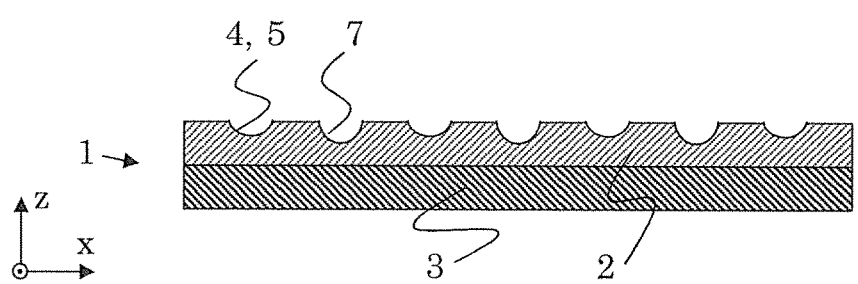

FIGS. 6a, 6b are schematic illustrations of a replication tool 1 having mitigating features 7 which are recesses in the tool material 2. FIG. 6a illustrates the replication tool 1 in a vertical view; FIG. 6b in a cross-sectional view.

The mitigating features 7 in FIGS. 6a, 6b are single recesses which are aligned in mutually parallel rows centering between neighboring rows of the replication sites 5. They may exhibit the same shape as the replication sites or (slightly) different shapes, such as illustrated in FIG. 6b. A difference between the replication sites 4 and the mitigating features 7 is established, e.g., in that the mitigating features 7 are not brought in contact with replication material from which the devices 10 are formed. E.g., the mitigating features 7 are not brought in contact with any replication material (optionally except for an exposure thereto in an optional conditioning process carried out prior to the actual replication process); and/or the mitigating features 7 are not exposed to a replication material during the replication process in which the devices 10 are produced; and/or the mitigating features 7 are exposed to a replication material during the replication process in which the devices 10 are produced, but whatever may be produced this way is not one of said devices 10.

Mitigating features 7 of such a kind can be produced, e.g., by shaping the tool material 2 accordingly, in particular already at the time of shaping the replication sites 5. This can be accomplished, e.g., using a suitably structured master in a replication process for shaping the tool material 2.

Here and in the other illustrated embodiments, the mitigating features 7 are not features which are merely peripherically located at the replication tool 1. But the arrangement of the mitigating features 7 overlaps the arrangement of the replication sites 5. And more particularly, the mitigating features 7 can interlace a grid defined by the replication sites 5.

Figure 7A:
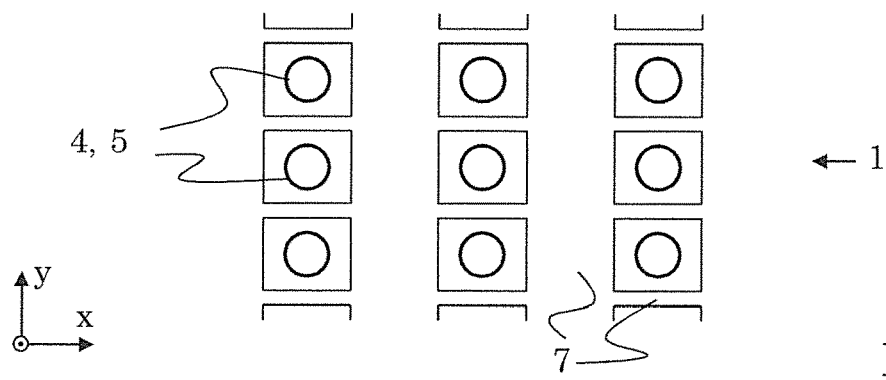
FIGS. 7a, 7b a schematic illustration of a replication tool having mitigating features, in a vertical view and in a cross-sectional view, respectively.
Figure 7B:
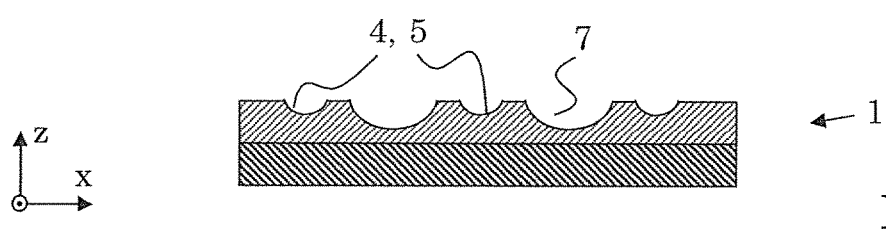

FIGS. 7a, 7b are schematic illustrations of a replication tool 1 having mitigating features 7 which are grooves in the tool material 2. FIG. 7a illustrates the replication tool 1 in a vertical view; FIG. 7b in a cross-sectional view.

The mitigating features 7 in FIGS. 7a, 7b are grooves. A portion of the grooves runs parallel to rows defined by next-neighbor replication sites 5 (i.e. aligned along the y-axis), and another portion perpendicularly thereto (i.e. aligned along the x-axis). The widths and/or the depths of the grooves can be different for the two portions. The grooves can be considered to establish a single mitigating feature, namely a mitigating feature constituting a groove lattice. The grooves can have cross-sections as illustrated in FIG. 7b. But they may also have different cross-sections, e.g., rectangular cross-section.

As described for FIGS. 6a, 6b, the mitigating features of FIGS. 7a, 7b can be produced, e.g., already at the time of shaping the replication sites 5, but they may, alternatively, be produced later, for example, by machining the tool material 2 (not illustrated).

Figure 8:
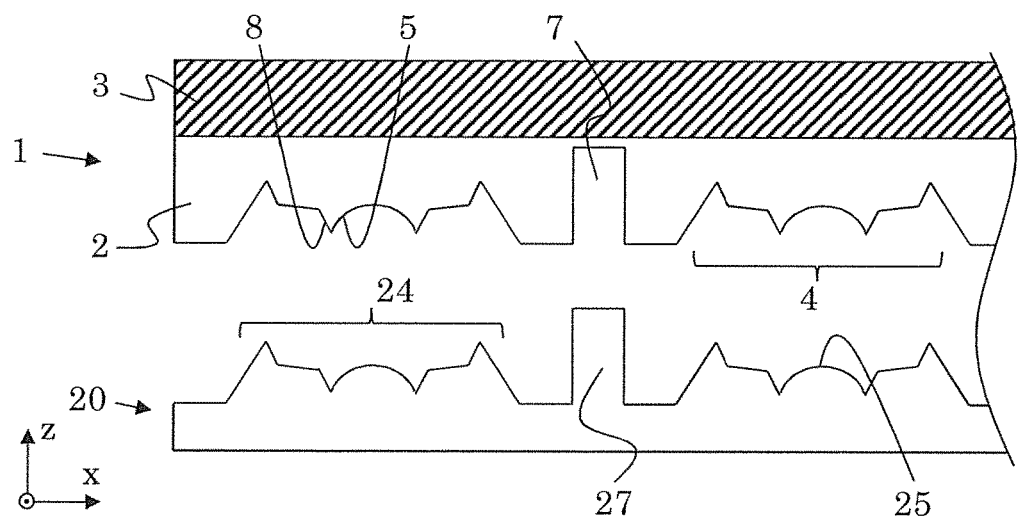
FIG. 8 a replication tool and a master for producing the replication tool, in a cross-sectional view.

FIG. 8 illustrates an example for such a way of producing mitigating features 7 at the time of shaping the replication sites 5.

FIG. 8 illustrates, in a cross-sectional view, a replication tool 1 and a master 20 used in producing the replication tool 1, more particularly for shaping the tool material 2 in a replication process.

Master 20 has shaping sites 24 for shaping the replication sites 4 of replication tool 1. Each shaping site 24 includes a shaping surface 25 for shaping a respective replication surface 5. Accordingly, the shaping sites 24 correspond (with respect to their shapes) to device surfaces of devices 10 to be produced and to negatives of the replication surfaces 5.

Furthermore, master 20 is shaped to exhibit further structures adjoining the shaping surfaces 25 for shaping additional surfaces portions 8 of the replication tool 1. These are useful in case the devices shall be produced by embossing with flow control, as will be explained below (cf. FIG. 9).

Still furthermore, master 20 includes in addition to the shaping sites 24 additional shaping sites 27 which are provided for shaping the mitigating feature(s) 7. Since the mitigating features 7 establish a recess, e.g., a groove, in the illustrated case, the additional shaping sites 27 establish a protrusion of master 20.

For example, tool material 2 in its initial, e.g., uncured, state can be applied to carrier 3 and shaped by master 20 in a vacuum injection molding process. During the shaping, it is hardened, e.g., cured. Then, the master is removed.

Figure 9:
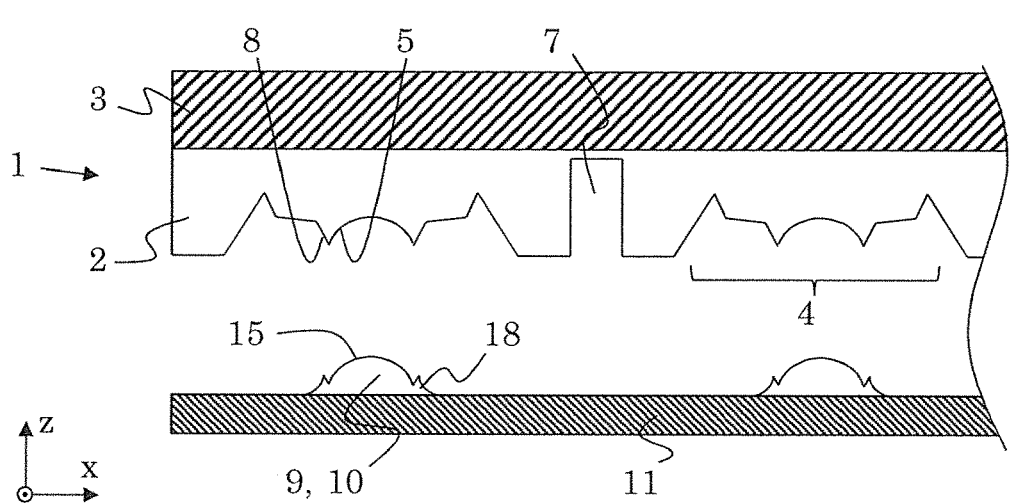
FIG. 9 the replication tool of FIG. 8 and devices produced using the replication tool, in a cross-sectional view.

FIG. 9 illustrates, in a cross-sectional view, replication tool 1 of FIG. 8 and devices 10 produced on a substrate 11 using replication tool 1. Each of the devices 10 constitutes a main portion of a structure produced from replication material using replication tool 1. Each device 10 exhibits a device surface 15. In addition, the produced structure includes a surrounding portion 18 at least partially surrounding (laterally) the respective device 10. The shape of the surrounding portions 18 is partially determined, more particularly shaped, by the additional surface portions 8 of replication tool 1 and partially shaped by flow of the replication material and the involved forces, predominantly by capillary forces.

The devices 10 can be, e.g., optical devices, such as lenses, more particularly microlenses. Asymmetric form errors of the described kind can lead, e.g., to an undesired optical aberrations such as an astigmatism of the (ideally rotationally symmetric) lenses. I.e. the lenses would exhibit different focal lengths for light impinging on the lens along different directions. The mitigating features 7 can reduce or remove such undesired astigmatism or other undesired (optical) effects arising from asymmetric form errors.

Depending on the circumstances, there are various reasons for which the mitigating features 7 can be applied and various effects the mitigating features 7 can have. For example:

The mitigating features can be provided for avoiding or at least reducing asymmetric form errors of the device surfaces produced.

The mitigating features can be provided for reducing a directionality of shape deviations (or: for reducing direction-dependent shape deviations) of the replication surface; more particularly for reducing a directionality of shape deviations of the replication surfaces from respective initial shapes of the replication surfaces. The initial shapes can correspond to a negative of the shape of a shaping surface of a master and/or to a negative of a shaping surface of a master and/or to a negative of a desired device surface. And/or the initial shapes correspond to shapes exhibited by the replication surface at the time of shaping the replication surfaces.

The mitigating features can be provided for reducing a directionality of shape deviations of the devices, more particularly of shape deviations of the device surfaces. The deviations can be deviations from a desired shape.

The mitigating features can be provided for reducing a directionality of shape deviations of the replication surfaces from respective shaping surfaces of a master used for shaping the tool material (and in particular the replication sites) in a replication process The mitigating features can be provided for reducing a directionality of shape deviations of the replication surfaces from a negative of respective desired device surfaces.

The mitigating features can be provided for increasing a homogeneity (or, vice versa, decreasing a directionality) of a distribution of tool material in a respective region around each the replication sites.

The mitigating features can be provided for provoking a (desired) deformation of the replication surfaces, in particular wherein said (desired) deformation at least partially reverses a pre-existing (undesired) deformation of the replication surfaces. This can in particular be the case if the mitigating features are produced after the replication sites have been produced. Reasons for the occurrence of such undesired deformations have been herein described.

The mitigating features can be provided for provoking an at least partial reversal of an (undesired) deformation of the replication surfaces; wherein said (undesired) deformations can have taken place after shaping the replication surfaces (e.g., using a suitable master). And said deformations can have occurred before shaping replication material by means of the replication surface to produce the devices. This can in particular apply if the mitigating features are produced after the replication sites have been produced.

The mitigating features can be provided for avoiding or reducing a deformation of the replication surfaces, in particular a deformation relative to a negative of a shaping surface of a master by means of which the replication surfaces are shaped during manufacturing the replication tool. This can in particular be the case if the mitigating features are produced simultaneously with the replication sites.

The mitigating features can establish one or more stress-relieving structures at which the tool material can relieve stress, in particular thermo-mechanical stress.

The mitigating features can contribute to making a distribution of the tool material in respective a region around each of the replication sites more uniform.

The mitigating features can effect that asymmetric form errors (and/or a directionality of shape deviations; from a respective master and/or from a (desired) device, as herein described) of the produced devices (and/or of the replication surfaces at the time of producing the devices by replication using the replication tool) which would occur with another replication tool, which is identical with the replication tool but merely does not include the mitigating features, are reduced (or even completely avoided). The identity of the replication tool and the other replication tool (without the mitigating features) can also include that both are manufactured identically—of course except for the provision of the mitigating features.

The mitigating features can be provided for reducing asymmetric form errors (as described) with respect to asymmetric form errors occurring when using another replication tool which is an identical replication tool, but which differs from the replication tool merely in that it is void of the mitigating features.

As will have become clear, the provision of the mitigating features can improve shaping fidelity and can result in the production of better quality devices.

The invention claimed is:

1. A method for manufacturing devices by replication, each of the devices comprising a device surface, the method comprising:
producing the devices from a replication material by replication using a replication tool;
wherein the replication tool comprises a tool material comprising replication sites comprising a replication surface each, wherein each of the replication surfaces corresponds to a negative of the device surface of a respective one of the devices, and wherein the tool material comprises, in addition to the replication sites, one or more mitigating features,
wherein the mitigating features comprise recesses, grooves, cuts or protrusions, and
wherein the replication sites and the mitigating features are separated by the tool material so that the replication material does not flow between the replication sites and the mitigating features during manufacturing and the devices are solely shaped by the replication sites,
wherein the mitigating features are features for at least one of:
reducing a directionality of shape deviations of the replication surfaces;
reducing a directionality of shape deviations of the replication surfaces from a negative of respective desired device surface shapes;
avoiding or at least reducing asymmetric form errors of the device surfaces;
reducing a directionality of a distribution of tool material in a respective region around each of the replication sites;
increasing a uniformity of a distribution of the tool material in respective regions around each of the replication sites; and
relieving stress in the tool material.

2. The method according to claim 1, further comprising producing the mitigating features after producing the replication surfaces, and wherein the mitigating features are features for at least one of:
for provoking at least partial reversal of an undesired deformation of the replication surfaces;
for provoking a desired deformation of the replication surfaces, wherein said desired deformation at least partially reverses a pre-existing undesired deformation of the replication surfaces.

3. The method according to claim 1, further comprising producing the mitigating features at the time of producing the replication surfaces, and wherein the mitigating features are features for avoiding or at least reducing a deformation of the replication surfaces, wherein the method comprises producing the replication surfaces by means of shaping surfaces of a master during manufacture of the replication tool, and wherein said deformation is a deformation relative to a negative of respective shaping surfaces of the master.

4. The method according to claim 1, wherein the replication surfaces comprise recesses in the tool material.

5. The method according to claim 1, wherein the devices are rotationally symmetric optical devices.

6. The method according to claim 1, wherein a lateral distribution of the replication sites has a symmetry lower than a rotational symmetry of order two, wherein the rotational symmetry is a two-fold mirror symmetry.

7. The method according to claim 1, wherein the producing the devices by replication comprises a carrying out an embossing process.

8. The method according to claim 1, wherein the replication tool comprises a rigid carrier to which the tool material is attached, and wherein the tool material is resilient and/or has an open-porous structure, and wherein the tool material is a silicone.

9. The method according to claim 1, wherein the mitigating features are interspersed with the replication sites.

10. A replication tool for manufacturing devices by means of replication, the replication tool comprising
a multitude of replication sites established in a tool material of the replication tool, each of the replication sites having a replication surface having a shape corresponding to a negative of a device surface of one of the devices; and, in addition,
one or more mitigating features,
wherein the mitigating features are features for avoiding or at least reducing asymmetric form errors of the devices
wherein the mitigating features comprise recesses, grooves, cuts or protrusions, and
wherein the replication sites and the mitigating features are separated by the tool material so that the replication material does not flow between the replication sites and the mitigating features during manufacturing and the devices are solely shaped by the replication sites.

11. The replication tool according to claim 10, wherein the replication sites are arranged on a non-square rectangular grid, and the mitigating features are interlacing the grid.

12. The replication tool according to claim 10, wherein the replication sites are arranged in mutually parallel rows, and at least a portion of the mitigating features are arranged between neighboring ones of the rows, wherein at least a portion of the mitigating features are arranged between each pair of neighboring ones of the rows.

13. The replication tool according to claim 10, wherein the mitigating features are located in the vicinity of each of the replication sites and are distinct from the replication surfaces and the replication sites.

14. The replication tool according to claim 10, wherein the replication surfaces comprise recesses in the tool material, wherein the replication surfaces are concave.

15. The replication tool according to claim 10, comprising a carrier to which the tool material is attached, wherein the carrier is stiffer than the tool material, wherein the tool material is a resilient material, wherein the tool material is a silicone.

16. The replication tool according to claim 10, wherein the mitigating features are features for reducing asymmetric form errors of the replication surfaces.

17. The replication tool according to claim 10, wherein the tool material has an open porous structure, wherein the tool material is a silicone.

18. The replication tool according to claim 17, wherein the tool material is a polydimethylsiloxane.

* * * * *